United States Patent
Mundkur (10) Patent No.: US 12,360,775 B2
(45) Date of Patent: Jul. 15, 2025

(54) POWER MANAGEMENT SYSTEM AND METHOD FOR OPERATING MULTIPLE HIGH-POWERED COMPONENTS USING A SINGLE POWER-OVER-ETHERNET CABLE CONNECTION

(71) Applicant: Jagdish Ramesh Mundkur, Yardley, PA (US)

(72) Inventor: Jagdish Ramesh Mundkur, Yardley, PA (US)

( * ) Notice: Subject to any disclaimer, the term of this patent is extended or adjusted under 35 U.S.C. 154(b) by 196 days.

(21) Appl. No.: 18/131,352

(22) Filed: Apr. 5, 2023

(65) Prior Publication Data

US 2024/0338222 A1 Oct. 10, 2024

(51) Int. Cl.
*G06F 9/4401* (2018.01)
*G06F 1/26* (2006.01)

(52) U.S. Cl.
CPC .............. *G06F 9/4401* (2013.01); *G06F 1/26* (2013.01)

(58) Field of Classification Search
None
See application file for complete search history.

(56) References Cited

U.S. PATENT DOCUMENTS

| | | |
|---|---|---|
| 7,155,622 B2 | 12/2006 | Mancey et al. |
| 7,706,392 B2 | 4/2010 | Ghoshal et al. |
| 7,941,677 B2 | 5/2011 | Penning |
| 8,310,089 B2 | 11/2012 | Schindler et al. |
| 9,880,598 B2 | 1/2018 | Luerkens et al. |
| 2004/0148060 A1 | 7/2004 | Lee |
| 2006/0117089 A1 | 6/2006 | Karam |
| 2007/0170909 A1 | 7/2007 | Vorenkamp et al. |
| 2007/0260904 A1 | 11/2007 | Camagna et al. |
| 2007/0288784 A1 | 12/2007 | Koper et al. |
| 2008/0067871 A1 | 3/2008 | Black et al. |
| 2010/0052421 A1 | 3/2010 | Schindler et al. |
| 2010/0223480 A1 | 9/2010 | Fratti et al. |
| 2012/0265361 A1 | 10/2012 | Billingsley et al. |
| 2013/0173937 A1 | 7/2013 | Lee |
| 2013/0307323 A1 | 11/2013 | Hasenei |

(Continued)

FOREIGN PATENT DOCUMENTS

| | | |
|---|---|---|
| CN | 101834755 | 9/2010 |
| CN | 207283589 | 4/2018 |

(Continued)

*Primary Examiner* — Fahmida Rahman
(74) *Attorney, Agent, or Firm* — LaMorte & Associates, P.C.

(57) ABSTRACT

A system and method of powering up multiple electronic components that are connected to a single cable of a PoE system, wherein combined startup power requirements of the electronic components surpass available power. A threshold wattage is selected that is no greater than the maximum wattage of the PoE system. The controller is powered on at an initial time point. A first of a plurality of monitors is powered on at a delayed time point after the initial time point. Subsequent monitors are powered up at subsequent time periods that are staggered in time. The sum of the wattages at any given time is maintained below the threshold wattage of the PoE system. By having the ability to alter the delay periods between component startups, the power consumption for the overall system can be adjusted.

9 Claims, 8 Drawing Sheets

(56) References Cited

U.S. PATENT DOCUMENTS

| | | | |
|---|---|---|---|
| 2016/0028655 A1 | 1/2016 | Alsup | |
| 2016/0041573 A1 | 2/2016 | Chen et al. | |
| 2016/0132086 A1* | 5/2016 | Hong | H04L 67/10 |
| | | | 713/300 |
| 2016/0370835 A1 | 12/2016 | Erickson et al. | |
| 2021/0247832 A1* | 8/2021 | Roy | H04L 12/40045 |
| 2023/0269107 A1* | 8/2023 | Song | H04L 12/10 |
| | | | 713/300 |

FOREIGN PATENT DOCUMENTS

| | | |
|---|---|---|
| CN | 109617039 | 2/2021 |
| DE | 102006036770 | 2/2008 |
| EP | 1 708 409 | 10/2006 |
| EP | 3021212 A1 | 5/2016 |
| JP | 2007088809 | 4/2010 |
| JP | 2011103034 | 5/2011 |

* cited by examiner

POWER MANAGEMENT SYSTEM AND METHOD FOR OPERATING MULTIPLE HIGH-POWERED COMPONENTS USING A SINGLE POWER-OVER-ETHERNET CABLE CONNECTION

BACKGROUND OF THE INVENTION

1. Field Of The Invention

In general, the present invention relates to Power over Ethernet (PoE) systems that provide both power and data to electronic devices. More particularly, the present invention relates to power management systems that enable a PoE system to operate multiple devices that, if mismanaged, could require more power to operate than the PoE system is able to provide.

2. Prior Art Description

As electronics and programming become more sophisticated in a widening array of devices, an ever-increasing number of devices have the ability to exchange data with a local area network (LAN). Exchanging data with a LAN can be accomplished either wirelessly or by using a cable connection to an Ethernet network. If a cable connection is used, the cable is typically a type of twisted pair cable. Such as a Cat5 cable, a Cat5e cable, or a Cat6 cable.

Traditional devices that connect to an Ethernet network require a wiring infrastructure that contains both a power receptacle and an Ethernet cable. The power receptacle is coupled to the power grid and provides AC power at 120 volts and 60 Hz in the United States. The powered device typically contains an AC/DC converter that coverts the incoming AC power to the operational DC voltage utilized by the internal electronics. The separate Ethernet cable is used to exchange data via DC signals to a modem or other access port to the LAN.

Providing both a power receptacle and an Ethernet cable to a particular position in a building is not always convenient. This is particularly true since the number of power receptacles on a circuit, and the positions in which power receptacles can be installed, are subject to various local and state building codes.

It is for these reasons that Power over Ethernet (PoE) systems have been developed. PoE systems provide both electrical power and data communications over an Ethernet cable. In this manner, only one Ethernet cable need be provided at a particular location. Furthermore, the electrical power provided via the Ethernet cable is DC. As such, the need for an AC/DC converter is eliminated.

There are several common techniques for transmitting power over Ethernet cabling. Three of them have been standardized by the Institute of Electrical and Electronics Engineers (IEEE) standard IEEE 802.3. These standards are known as alternative A, alternative B, and 4PPoE. Of the three standardized types, 4PPoE, also known as PoE++, has the ability to provide the most power to a device. The IEEE standard for a 4PPoE system can handle up to 100 watts of power at the source and 71.3 watts at the load. This enables the 4PPoE cable to extend up to 100 meters. The voltage limits is between 52 volts and 75 volts at the source and between 41.1 volts and 57 volts at the load. The maximum current that can be transmitted is 960 mA per twisted wire pair within the Ethernet cable. Most Ethernet cables utilize thin wire that is between 24 AWG and 26 AWG. As such, the wire can rapidly heat if the maximum current limit is surpassed.

Given the voltage and current limitations of a 4PPoE system, only certain types of electronic devices are eligible for use with the system. The devices have to be able to operate using DC voltage and draw no more than 71.1 watts during all phases of operation. Since this limit is the maximum, the actual limit used in industry is at least ten percent less, or approximately 64 watts, to ensure for some margin of error. This limitation in available wattage is substantial. For example, suppose a computer with a display screen is to be operated using a 4PPoE system. As the computer boots up, there is a peak in current draw as fans activate, network handshake signals are processed, the operating system begins to run, and the various electronics become active and heat. According to specifications, an exemplary Intel® i5 8400 processor will draw about 54 watts at startup or when running at full capacity. Likewise, an average computer LED screen operates at between 20 watts and 30 watts, but this power requirement may spike by nearly double at start-up. Accordingly, the wattage requirements of an average laptop can readily exceed the 64 watts that may be available through a 4PPoE system. The only option available is to either connect to a traditional 120-volt power receptacle or severely limit the processing power and/or display screen of the computer.

Since the power available through a 4PPoE system is limited, complex large screen systems or multiscreen systems are unavailable. For example, many computers workstation in the modern office space utilize two or three display screens. If each screen draws 20 watts, the use of three screens in a PoE system is theoretically possible. However, if each screen spikes at 40 watts during start-up, such a system cannot be operated using a 4PPoE system.

In the prior art, there are some systems that address the problems of power management inherent in a PoE system. In U.S. Pat. No. 7,706,392 to Ghoshal, a PoE system is described that sends a handshake signal between the power sourcing equipment and any powered device that may be attached. The handshake signal identifies the power requirements of the power device(s) so that the power sourcing equipment can adjust the output power. However, this system does not address how to operate multiple powered devices whose combined wattage requirements may surpass the limits of the PoE system.

U.S. Patent Application Publication No. 2007/0288784 to Koper, discloses a limited power management system that simply disables power at various output ports of the power sourcing equipment at different times. This produces a rolling blackout effect to the various power devices that may be attached. Such batched power management is obviously inappropriate for systems where all components are expected to be running at the same time, such as with a computer and the computer display.

A need therefore exists for a power management protocol and method that can be used with a 4PPoE system that enables multiple powered devices to be used simultaneously without exceeding the wattage limits of the cables, even though the multiple powered devices have the ability to exceed those limits when operated simultaneously. This need is met by the present invention as described and claimed below.

SUMMARY OF THE INVENTION

The present invention is a method of powering up multiple electronic components that are connected to a single cable of a PoE system, wherein combined startup power requirements of the electronic components during startup surpass available power supplied through the PoE system. Accordingly, a method of power management is required.

For the exemplary embodiment of a system having a controller and monitors, the controller runs a BIOS protocol during a startup period after being powered on. The monitors are controlled, at least in part, by the controller. The controller and the plurality of monitors are powered by a single cable of the PoE system, wherein the PoE systems provides a maximum wattage through the cable.

A threshold wattage is selected that is no greater than the maximum wattage of the PoE system. The controller is powered on at an initial time point. The controller requires a first wattage during startup as it runs its BIOS protocol. A first of a plurality of monitors is powered on at a second time point that is a first time period after the initial time point. The first monitor requires a second wattage. Subsequent monitors are powered up at subsequent time periods that are staggered in time. Each subsequent monitor requires a subsequent wattage to startup and operate.

The sum of the first wattage, the second wattage and subsequent wattage are maintained below the threshold wattage of the PoE system. By having the ability to delay the time between component startups, the power consumption for the overall system can be adjusted to work for different maximum wattage thresholds, provided the combined average power draw of all components does not exceed the maximum wattage threshold.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention system and methodology can be embodied in many ways, only a few exemplary embodiments are illustrated. The exemplary embodiments are being shown for the purposes of explanation and description. The exemplary embodiments are selected in order to set forth some of the best modes contemplated for the invention. The illustrated embodiments, however, are merely exemplary and should not be considered limitations when interpreting the scope of the appended claims.

Figure 1:
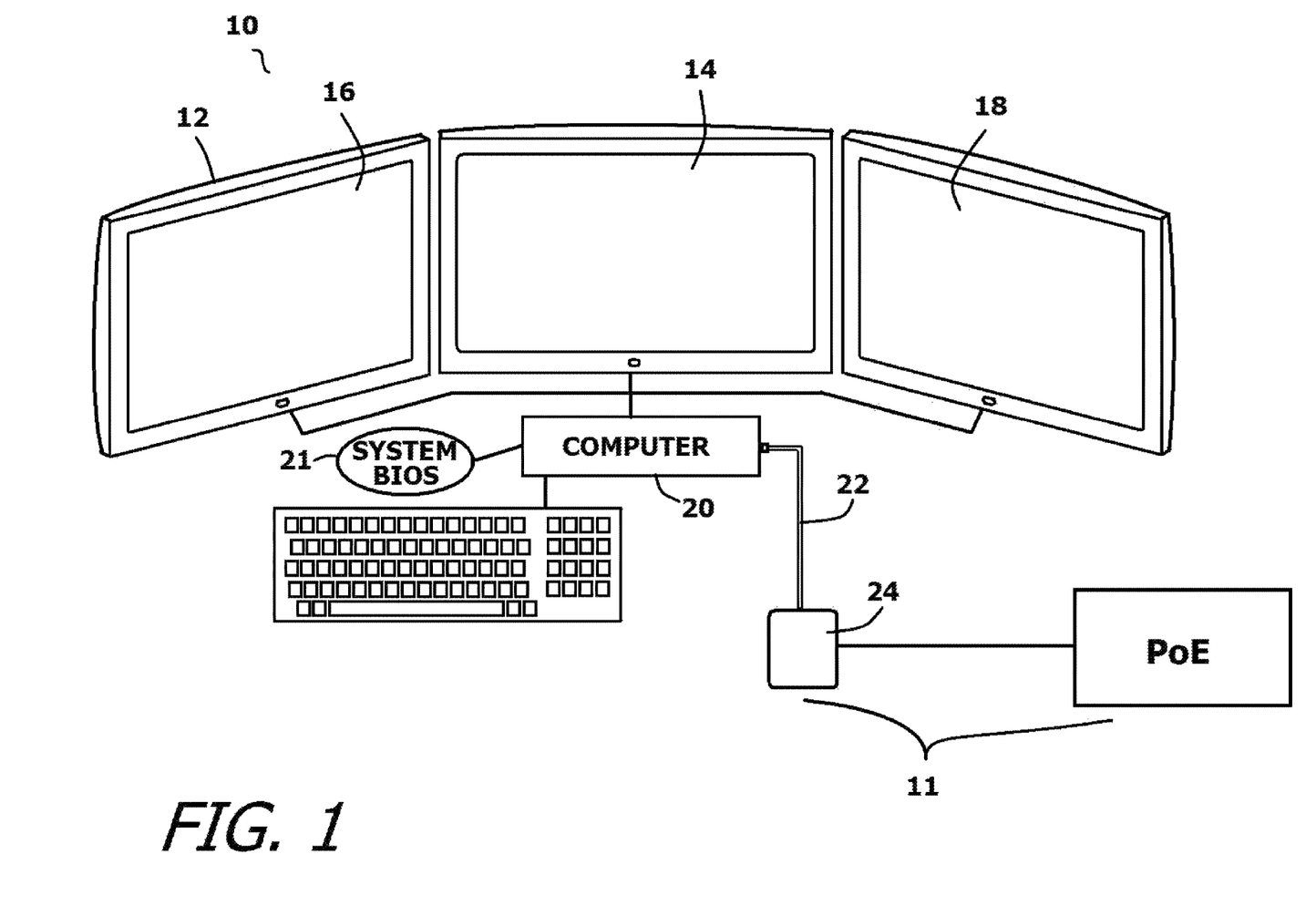
FIG. 1 shows an exemplary embodiment of a powered device in the form of a personal computer that has multiple monitors.

Referring to FIG. 1, an exemplary powered device 10, in the form of a multiscreen computer station 12 is shown. The multiscreen computer station 12 has three monitors 14, 16, 18 that display images from a computer 20. In the shown embodiment, the computer 20 is being shown as a construct that is separate and distinct from the monitors 14, 16, 18. However, it will be understood that the computer 20 and one of the monitors can be integrated into a single unit, as is commonplace for modern computer workstations.

The computer 20 and the three monitors 14, 16, 18 are all powered from a single Ethernet cable 22. The Ethernet cable 12 leads to power sourcing equipment 24. The power sourcing equipment 24 is a device that provides electrical power through the Ethernet cable 22. Examples of power sourcing equipment 24 include a network switch, commonly called an endspan device, and an external PoE injector, commonly called a midspan device.

Figure 2:
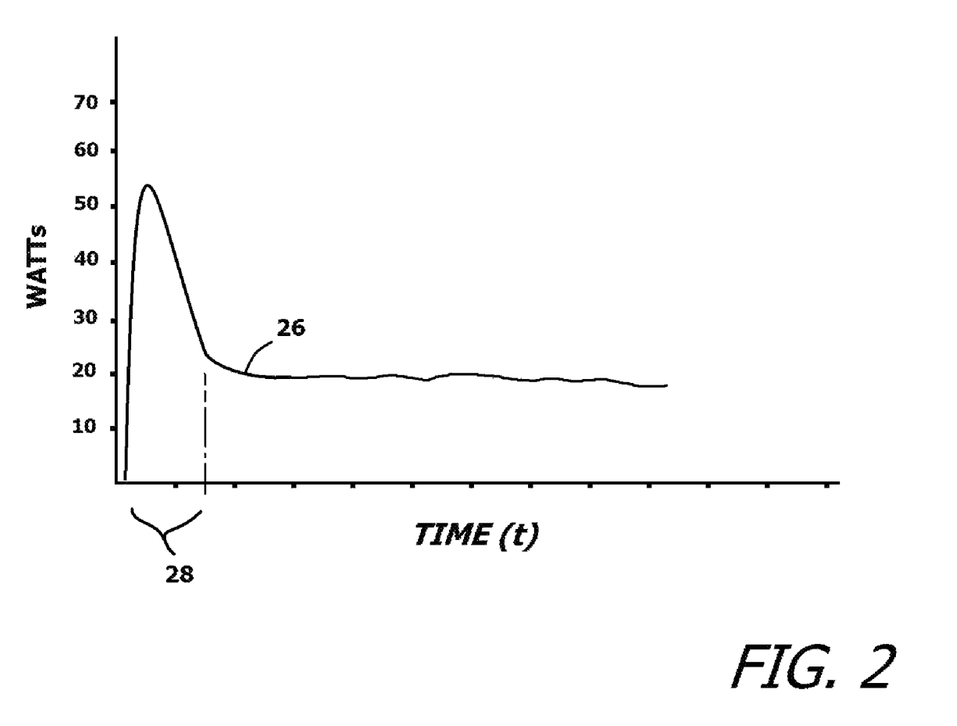
FIG. 2 shows a graph displaying the power consumption rate for the computer used in the exemplary embodiment of FIG. 1.

Referring to FIG. 2 in conjunction with FIG. 1, it will be understood that the when the exemplary computer 20 is first turned on, the computer power requirements peak. FIG. 2 shows a first waveform 26 that represents the power consumption of the computer 20 over a short period of time during and just after startup. The first waveform 26 shows that there is a motherboard startup period 28 where more than fifty watts can be drawn. This motherboard startup period 28 is short lived, and typically lasts for between ten seconds and thirty seconds for a computer with a modern microprocessor. During this motherboard startup period 28, the computer 20 runs its Basic Input/Output System, also known as the System BIOS 21. The system BIOS 21 is firmware that provides runtime services for operating systems and programs and provides hardware initialization during the startup process.

Figure 3:
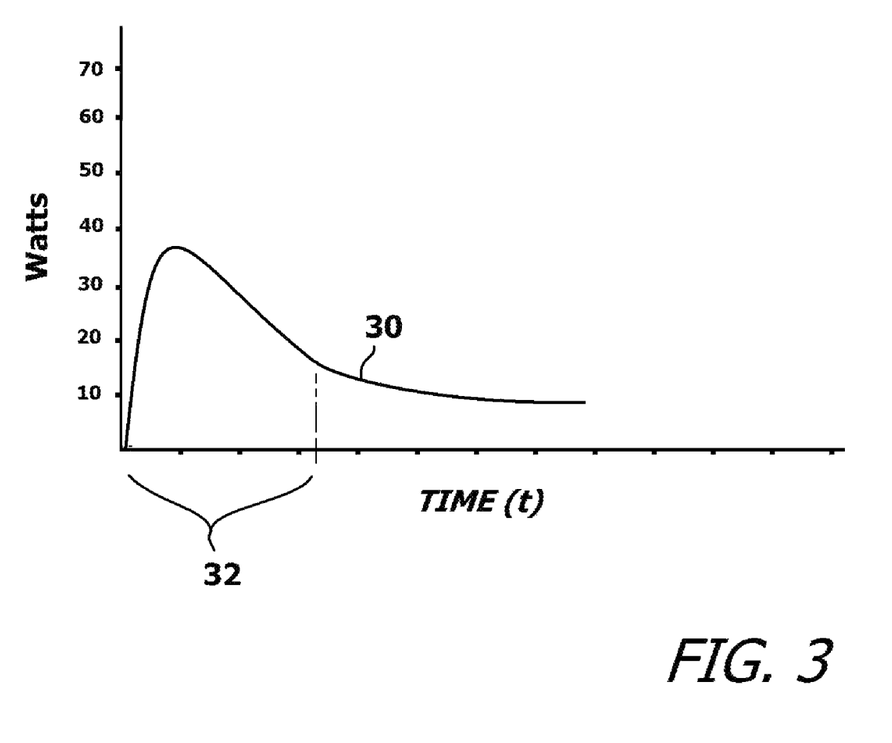
FIG. 3 shows a graph displaying the power consumption rate for one of the monitors used in the exemplary embodiment of FIG. 1.

Referring to FIG. 3 in conjunction with FIG. 1, it will be understood that when each of the three monitors 14, 16, 18 power up, the power requirements peak. FIG. 3 shows a second waveform 30 that represents the power consumption of any one of the monitors 14, 16, 18 over a short period of time during and just after startup. The second waveform 30 shows that there is a monitor startup period 32 where more than thirty watts can be drawn. This is nearly double the average operating power drawn by the same monitor once operational. This monitor startup period is also short lived, and typically lasts for between five seconds and fifteen seconds depending upon the size and resolution of the monitor.

Figure 4:
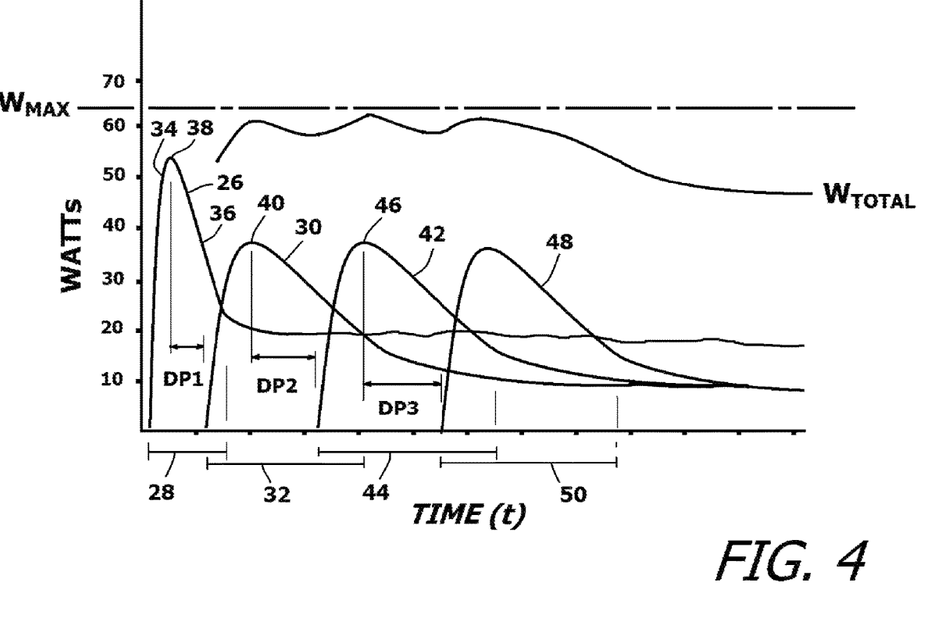
FIG. 4 shows a graph that superimposes the graph of FIG. 2 with the graph of FIG. 3 and adds the graphs of the two other monitors used in the exemplary embodiment if FIG. 1.

Referring to FIG. 4 in conjunction with FIG. 1, FIG. 2 and FIG. 3, it can be seen that the present invention power management system staggers the start of the computer 20 and the monitors 14, 16, 18. Instead of starting the computer 20 and the monitors 14, 16, 18 all at the same time, the startup of these components is choreographed so that the draw of wattage at any one time is below the maximum threshold of rating of the PoE system 11. The delays embodied within the staggered start can be controlled by being elongated or shortened. In this manner, the power management system can be tuned to the requirements of a particular system or to changes in regulations. For example, in a 4PPoE system, the maximum power rating is just over 71 watts. Some building codes may require a safety factor of ten percent, resulting in a maximum wattage of approximately 64 watts. This recommended safety factor may be different in other states or may be updated over time to fifteen percent or twenty percent, for example. Using the power management system, such changes can be accommodated by elongating the overall startup sequence.

Figure 5:
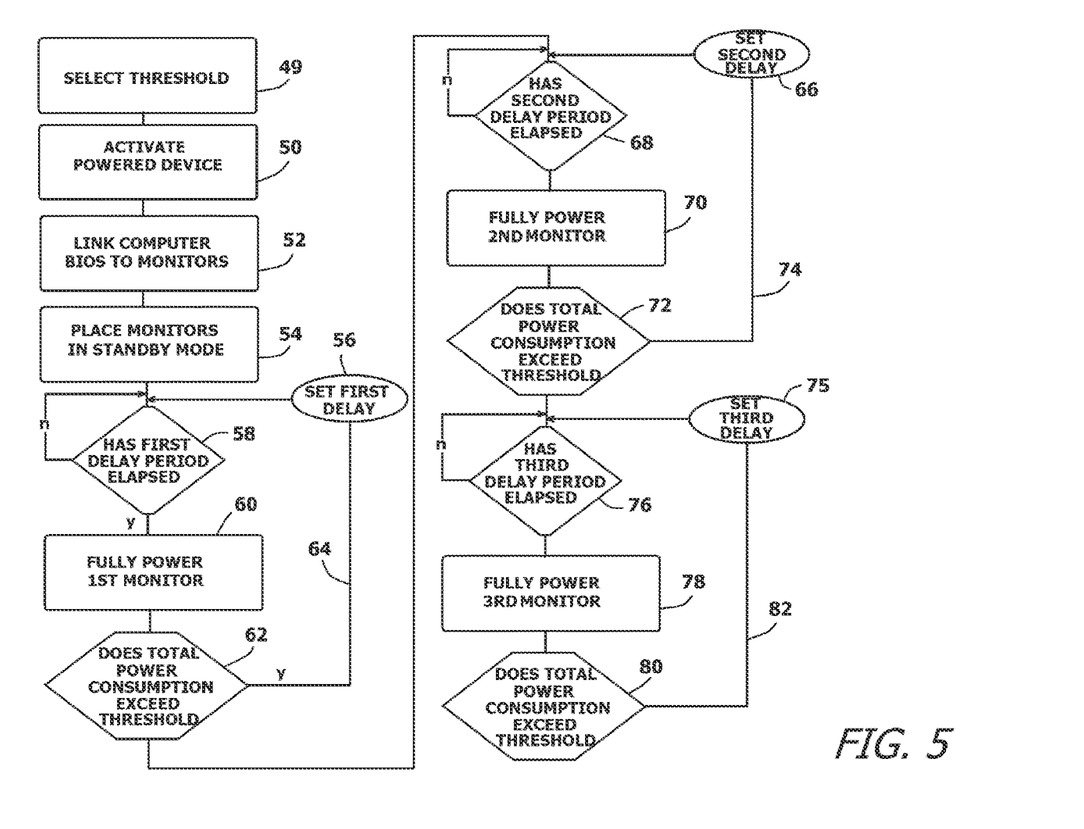
FIG. 5 is a block diagram schematic outlining a first exemplary method of operation for the present invention using dynamic control parameters.

Referring to FIG. 5 in conjunction with FIG. 1 through FIG. 4, the methodology of the startup sequence can be explained. Depending upon the PoE system being utilized and local, state, and/or federal regulations, a threshold wattage is selected. See Block 49. The threshold wattage is always less than the maximum wattage of the PoE system 11. Assuming that a powered device 10 is connected to a PoE system 11, the powered device 10 is activated by a user. See Block 50. The powered device 10 can have multiple components that consume power. Each of these components has an average power consumption rate during ordinary operations and conditions. The number and types of components are limited by the average power consumption rates. The sum of the average consumption rates cannot be greater than the threshold maximum wattage of the PoE system 11.

The purposes of an example, the powered device 10 can be assumed to be the multiscreen computer workstation 12 of FIG. 1. The first component to begin to power up is the computer 20. More particularly, the motherboard of the computer 20 and the accessories it requires to run the startup protocol of the system BIOS 21 are powered. Power to nonessential components, such as the keyboard, speakers, camera, mouse, and the like, can be delayed until the end of the motherboard startup period 28.

During the motherboard startup period 28, the power consumption rate is represented by the first waveform 26. The first waveform 26 has an ascending slope 34 of rising power use and a descending slope 36 of falling power use. The peak 38 of consumption is at the transition between the ascending slope 34 and the descending slope 36. During the period of rising power use, a handshake or data linking protocol is exchanged with each of the monitors 14, 16, 18. The data linking protocol starts a data link between the now running system BIOS 21 of the computer 20 and each monitor 14, 16, 18. See Block 52. However, the screens of the monitors 14, 16, 18 are not powered. Rather, the monitors 14, 16, 18 are primed into a standby mode or sleep mode. See Block 54. Such function modes are already in the control circuity of the monitors 14, 16, 18. The running of the data link protocol takes less than one watt to execute and is negligible in view of the overall power consumption.

As the protocols of the system BIOS 21 run, the demands of power decrease. This is shown where the first waveform 26 of the computer's power consumption changes to the descending slope 36. A first delay period DP1 is set. At the first delay period DP1 after the peak 38 of the first waveform 26, the screen startup of the first monitor 14 begins. See Blocks 56, 58 and 60. The data link of the system BIOS 21, between the computer 20 and the first monitor 14, that set the first monitor 14 into its standby mode has been established. As such, the first monitor 14 stands in the same condition as it would be in its sleep mode, a.k.a. standby mode. That is, the machine state of the first monitor 14 is held in RAM and is not being dynamically generated by the motherboard of the computer 20. As soon as the first delay period DP1 passes, the first monitor 14 is awakened and power begins to be supplied to its display. Thus, images can be seen on the first monitor 14.

As the first monitor 14 is awakened and begins to power up, it creates the power consumption profile represented by a second waveform 30. The monitor startup period 32 of the second waveform 30 overlaps the motherboard startup period 28 of the first waveform 26 in time by a degree governed by the first delay period DP1. The total power peak ($W_{TOTAL}$) at all times (t) is designed not to exceed the maximum operational wattage (Wmax). The longer the first delay period DP1, the shorter the overlap. Within the overlap, the total power consumption is the sum of the power consumption of the computer 20 and the power consumption of the first monitor 14 at any given time (t). The total power consumption, therefore, can be maintained below the maximum operational wattage (Wmax) through the control of the first delay period DP1. As is indicated by Block 62 and loop line 64, if the total power consumption exceeds the threshold, then the first delay period DP1 is increased to further separate the motherboard startup period 28 and the monitor startup period 32.

As the first monitor 14 powers up, the demands of power decrease. This is shown where the second waveform 30 of the first monitor's power consumption reaches a peak 40 and begins to descend. A second delay period DP2 is set. At the second delay period DP2 after the peak 40 of the second waveform 30, the screen startup of the second monitor 16 begins. See Blocks 66, 68 and 70. The data link of the system BIOS 21 between the computer 20 and the second monitor 16 has been established. As such, the second monitor 16 stands in the same condition as it would in its sleep or standby mode. As soon as the second delay period DP2 passes, the second monitor 16 is awakened and power begins to be supplied to its display. See Block 70.

As the second monitor 16 is awakened and begins to power up, it creates the power consumption profile represented by a third waveform 42. The third waveform 42 has a second monitor startup period 44 that overlaps the first monitor startup period 32 and some of the stabilizing first waveform 26 of the computer 20. The second monitor startup period 44 overlaps the first monitor startup period 32 in time by a degree governed by a third delay period DP3. The total power peak ($W_{TOTAL}$) at all times (t) is designed not to exceed the maximum operational wattage (Wmax). The longer the third delay period DP3, the shorter the overlap between the second monitor startup period 44 and the first monitor startup period 32. Within the overlap, the total power consumption is the sum of the power consumption of the computer 20, the power consumption of the first monitor 14, and the power consumption of the second monitor 16 at any given time (t). The total power consumption, therefore, can be maintained below the maximum operational wattage (Wmax) through the control of the second delay period DP2. As is indicated by Block 72 and loop line 74, if the total power consumption exceeds the threshold, then the second set delay period DP2 is increased.

As the second monitor 16 powers up, the demands of power decrease. This is shown where the third waveform 42 of the second monitor's power consumption reaches a peak 46 and begins to descend. A third delay period DP3 is set. At the third delay period DP3 after the peak 46 of the third waveform 42, the screen startup for the third monitor 18 begins. See Blocks 74, 76 and 78. The data link of the system BIOS 21 between the computer 20 and the third monitor 18 has been established. As such, the third monitor 18 stands in the same condition as it would in its sleep or standby mode. As soon as the third delay period DP3 passes, the third monitor 18 is awakened and power begins to be supplied to its display. See Block 78.

As the third monitor 18 is awakened and begins to power up, it creates the power consumption profile represented by a fourth waveform 48. The fourth waveform 48 has a third monitor startup period 50 that overlaps the second monitor startup period 44 and some of the stabilizing first waveform 26 of the computer 20 and the second waveform 30 of the first monitor 14. The third monitor startup period 50 overlaps the second monitor startup period 44 in time by a degree governed by the third delay period DP3. The total power peak at all times (t) is designed not to exceed the maximum operational wattage (Wmax). The longer the third delay period DP3, the shorter the overlap between the third monitor startup period 50 and the second monitor startup period 44. Within the overlap, the total power consumption ($W_{TOTAL}$) is the sum of the power consumption of the computer 20, the power consumption of the first monitor 14, the power consumption and the second monitor 16, and the power consumption of the third monitor 18, at any given time (t). The total power consumption, therefore, can be maintained below the maximum operational wattage (Wmax) through the control of the third delay period DP3. As is indicated by Block 80 and loop line 82, if the total power consumption exceeds the threshold, then the second set delay period DP3 is increased.

From the above description, it will be understood that a powered device 10 containing multiple monitors 14, 16, 18 or other powered components can be powered on and operated over a single PoE cable 22, even if the combined peak power requirements of all the components exceeds the power rating of the PoE system 11. This is accomplished by setting a maximum wattage threshold and staggering the startup of the various components so that at any time (t), the total power draw ($W_{TOTAL}$) is less than the maximum wattage threshold (Wmax). By having the ability to alter the delay periods between component startups, the overall power management system can be adjusted to work for different maximum wattage thresholds, provided the combined average power draw of all components does not exceed the maximum wattage threshold.

In the operational flow outlined on FIG. 5, the control of power to the various monitors 14, 16, 18 is dynamic. In this manner, the system will automatically compensates should a monitor become damaged and draw more or less power than typical. Likewise, if one or all of the monitors are replaced with monitors of different sizes or resolutions is replaces with a monitors, the control system will automatically adjust. If the changes result is a power consumption profile that cannot fit within the set threshold, then an alarm condition is met and the system operator can repair or replace the monitors as required.

Figure 6:
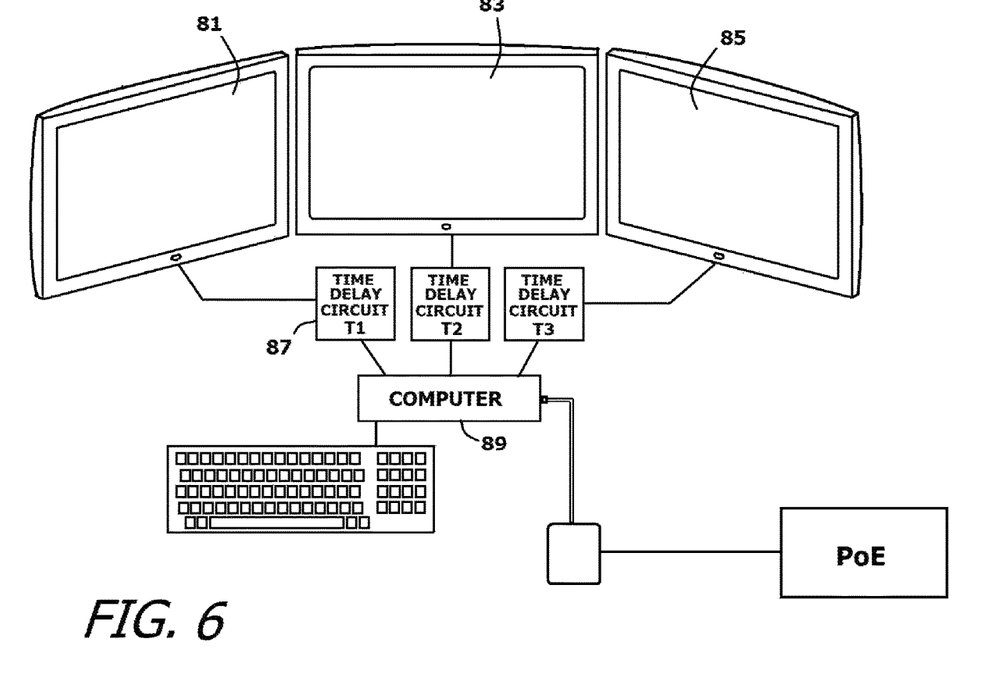
FIG. 6 shows a variation of a powered device, having a computer and monitors with preselected start up times.

It is likely that the present invention will be incorporated into an overall system where the computer and monitors have well known power requirements. In such a system, the operational flow of FIG. 5 can be simplified. Referring to FIG. 6, it can now be seen that the monitors 81, 83, 85 each contain an internal power delay circuit 87 that is not dynamically controlled by the computer 89. The computer 89 powers up starting a time (T1). After a first fixed delay, the first monitor 81 powers up at time (T2). After a second fixed delay, the second monitor 83 powers up at time (T3). Lastly, after a third fixed delay, the third monitor 85 powers up at time (T4). The delay times are selected in view of the known start up power requirements of the computer 89 and the monitors 81, 83, 85.

Figure 7:
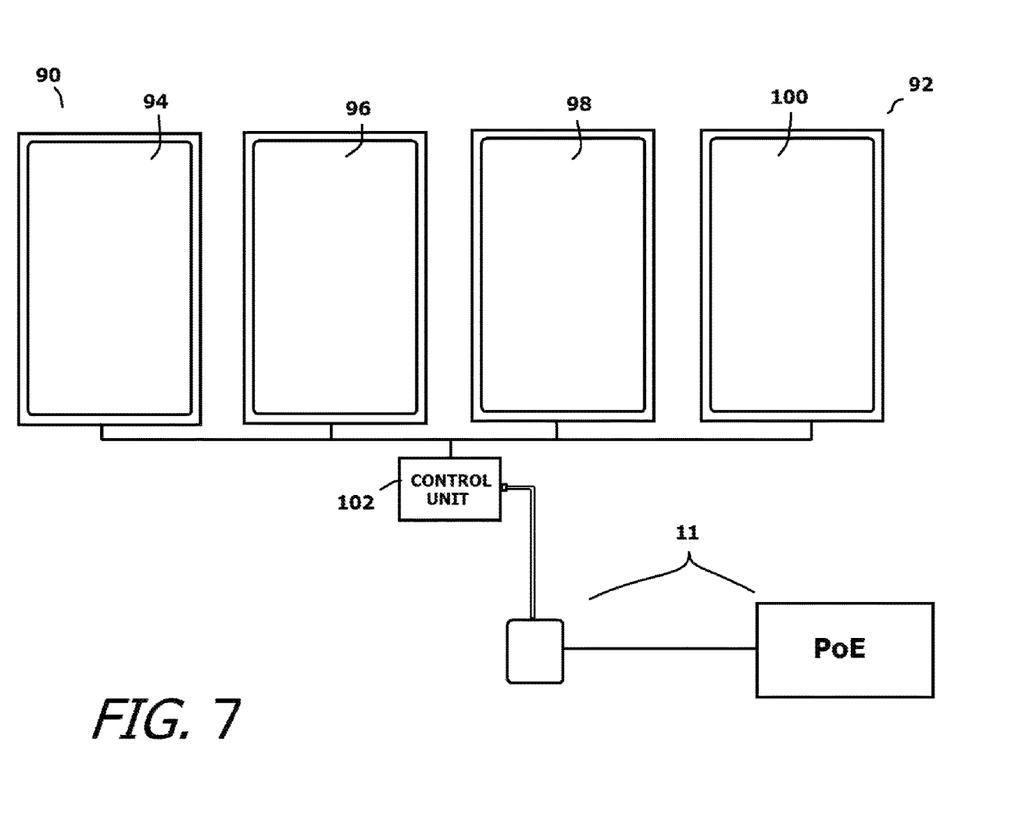
FIG. 7 shows an alternate embodiment of a powered device in the form of a commercial display that contains four monitors and a customized microprocessor.

Referring to FIG. 7, an alternate powered device 90 is shown that is connected to a PoE system 11. The powered device 90 is a commercial signage display 92 that contains four monitors 94, 96, 98, 100. Such signage displays 92 are commonly used in airports, train stations, offices, restaurants, and the like. In such applications, the signage displays 92 are typically not connected to a personal computer. As such, a separate controller is provided in order to implement the present invention power management system. A compact dedicated control unit 102 is provided that is designed to run on the PoE system 11. The control unit 102 contains a microprocessor, the BIOS protocols, and the display drivers needed to operate the four monitors 94, 96, 98, 100.

Figure 8:
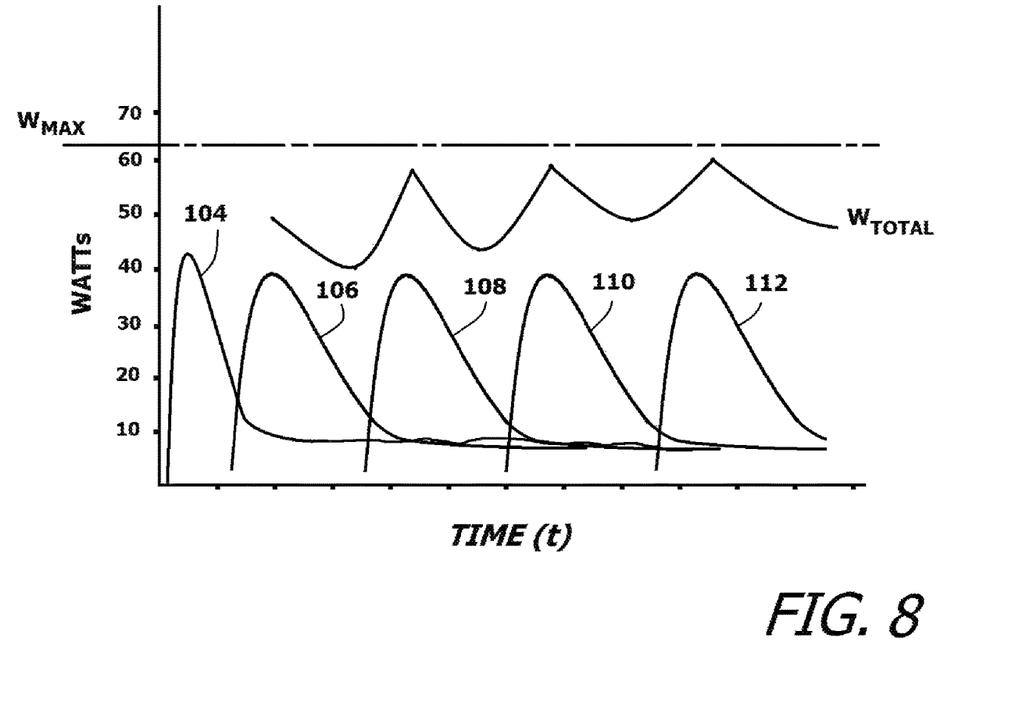
FIG. 8 shows a graph displaying the power consumption rate for the controller and monitors of the commercial display shown in FIG. 7.

Referring to FIG. 8 in conjunction with FIG. 7, it can be seen that the control unit 102 has a first power surge at startup, represented by the first waveform 104. The surge is less than that of a personal computer, since the control unit 102 is dedicated to the operation of the four monitors 94, 96, 98, 100 and does not contain the fans and peripherals that are hardwired into a personal computer. Since the power requirements of the control unit 102 are lower, either more or larger display monitors can be used. In FIG. 8, the power surge waveform 104 for the control unit 102 is shown. Also shown are the respective power surge waveforms 106, 108, 110, 112 of the four monitors 94, 96, 98, 100. As can be seen, the power surge waveforms are staggered in time (t). The delay between each of the waveforms 104, 106, 108, 110, 112 is calculated so that the sum of all power requirements ($W_{TOTAL}$) never exceeds the maximum wattage threshold (Wmax) set for the system.

It will be understood that the embodiments of the present invention that are illustrated and described are merely exemplary and that a person skilled in the art can make many variations to those embodiments. All such embodiments are intended to be included within the scope of the present invention as defined by the claims.

What is claimed is:

1. A method, comprising:
   providing a controller that runs a BIOS protocol during a startup period after being powered on;
   providing a plurality of monitors that are controlled, at least in part, by said controller, wherein said controller and said plurality of monitors are powered by a single cable of a power-over-ethernet system, and wherein said single cable has a maximum wattage rating;
   setting a threshold wattage that is no greater than said maximum wattage rating;
   powering said controller at an initial time point, wherein said controller runs said BIOS protocol, and wherein said controller requires a first wattage that is less than said threshold wattage;
   powering a first monitor of said plurality of monitors at a second time point that is a first delay period after said initial time point, wherein said first monitor requires a second wattage;
   powering a subsequent monitor of said plurality of monitors at a subsequent time period that is a subsequent delay period after said first delay period, wherein said subsequent monitor requires a subsequent wattage;
   wherein a sum of said first wattage, said second wattage and said subsequent wattage are maintained below said threshold wattage.

2. The method according to claim 1, wherein said first delay period and said subsequent delay period are fixed time periods of predetermined duration.

3. The method according to claim 1, wherein said first delay period and said subsequent delay period are dynamically adjusted by said controller.

4. The method according to claim 3, further including extending said first delay period between said initial time point and said second time point should a sum of said first wattage and said second wattage at least equal said threshold wattage.

5. The method according to claim 3, further including extending said second delay period between said second time point and said subsequent time point should a sum of said first wattage, said second wattage, and said subsequent wattage at least equal said threshold wattage.

6. The method according to claim 1, wherein said plurality of monitors are set into a standby mode by said BIOS protocol run by said controller during said startup period.

7. The method according to claim 6, wherein said first monitor is set into a standby mode by said BIOS protocol between said initial time point and said second time point.

8. The method according to claim 1, wherein said controller is a personal computer and said plurality of monitors are monitors for said personal computer.

9. The method according to claim 1, wherein said controller is a unit dedicated to controlling said plurality of monitors.

\* \* \* \* \*